(12) United States Patent
Wu et al.

(10) Patent No.: US 8,467,280 B2
(45) Date of Patent: Jun. 18, 2013

(54) CONTROLLER AND METHOD EMPLOYED IN OPTICAL STORAGE APPARATUS FOR GENERATING CONTROL SIGNALS EACH HAVING MINIMUM TRANSMISSION PULSE LENGTH CORRESPONDING TO MORE THAN ONE POWER SYMBOL PERIOD

(75) Inventors: Gwo-Huei Wu, Taipei Hsien (TW); Pi-Hai Liu, Hsinchu County (TW); Chih-Ching Chen, Miaoli County (TW)

(73) Assignee: Mediatek Inc., Science-Based Industrial Park, Hsin-Chu (TW)

( * ) Notice: Subject to any disclaimer, the term of this patent is extended or adjusted under 35 U.S.C. 154(b) by 664 days.

(21) Appl. No.: 12/602,103

(22) PCT Filed: Nov. 23, 2009

(86) PCT No.: PCT/CN2009/075084
§ 371 (c)(1),
(2), (4) Date: Nov. 27, 2009

(87) PCT Pub. No.: WO2010/094196
PCT Pub. Date: Aug. 26, 2010

(65) Prior Publication Data
US 2011/0075530 A1     Mar. 31, 2011

Related U.S. Application Data

(60) Provisional application No. 61/153,352, filed on Feb. 18, 2009.

(51) Int. Cl.
*G11B 19/02* (2006.01)
(52) U.S. Cl.
USPC ............................. 369/59.11; 369/59.13

(58) Field of Classification Search
USPC .................. 369/47.1, 59.11, 59.12; 327/141, 327/161
See application file for complete search history.

(56) References Cited

U.S. PATENT DOCUMENTS

| | | | |
|---|---|---|---|
| 5,974,022 A | 10/1999 | Kimura | |
| 7,123,566 B2 | 10/2006 | Sasaki | |
| 2004/0027951 A1* | 2/2004 | Seo | 369/47.52 |
| 2005/0083828 A1 | 4/2005 | Chen | |
| 2006/0274624 A1* | 12/2006 | Toda et al. | 369/59.11 |
| 2008/0008066 A1* | 1/2008 | Rees et al. | 369/47.15 |
| 2010/0142338 A1* | 6/2010 | Kobayashi et al. | 369/47.15 |
| 2012/0039157 A1* | 2/2012 | Chang et al. | 369/59.11 |

FOREIGN PATENT DOCUMENTS

| | | |
|---|---|---|
| EP | 1 282 122 A2 | 2/2003 |
| WO | 2008007239 A2 | 1/2008 |

OTHER PUBLICATIONS

International application No. PCT/CN2009/075084, International filing date: Nov. 23, 2009, International Search Report mailing date: Mar. 4, 2010, 10 pages.

* cited by examiner

*Primary Examiner* — Wayne Young
*Assistant Examiner* — Dionne Pendleton
(74) *Attorney, Agent, or Firm* — Winston Hsu; Scott Margo

(57) ABSTRACT

A controller of an optical storage apparatus for generating a plurality of control signals is provided. The controller includes a code generator implemented for determining a plurality of control codes according to an input data associated with data recording, and generating the control signals to deliver the control codes. Each of the control codes represents one power level. Besides, regarding each of the control signals, a minimum transmission pulse length thereof corresponds to more than one power symbol period.

20 Claims, 16 Drawing Sheets

| State | Control code (Code_2) | | | | Mapped Power symbol | Switch on/off | | |
|---|---|---|---|---|---|---|---|---|
| | Code name | WEN1 | WEN2 | WEN3 | | OE1 | OE2 | OE3 |
| S0 | c1 | 0 | 0 | 0 | Pc | 0 | 0 | 0 |
| S1 | s1 | 0 | 0 | 1 | Ps | 1 | 0 | 0 |
| S2,S2' | w2 | 0 | 1 | 0 | Pw | 1 | 1 | 1 |
| S3 | s2 | 0 | 1 | 1 | Ps | 1 | 0 | 0 |
| S4,S4' | m1 | 1 | 0 | 0 | Pm | 1 | 1 | 0 |
| S5,S5' | w1 | 1 | 0 | 1 | Pw | 1 | 1 | 1 |
| S6,S6' | m2 | 1 | 1 | 0 | Pm | 1 | 1 | 0 |
| S7 | c2 | 1 | 1 | 1 | Pc | 0 | 0 | 0 |

FIG. 5

| Control code | | | | Mapped Power | Switch on/off | | |
| --- | --- | --- | --- | --- | --- | --- | --- |
| Code name | WEN1 | WEN2 | WEN3 | symbol | OE1 | OE2 | OE3 |
| c1 | 0 | 0 | 0 | Pc | 0 | 0 | 0 |
| w2 | 0 | 0 | 1 | Pw | 1 | 1 | 1 |
| m1 | 0 | 1 | 0 | Pm | 1 | 1 | 0 |
| m2 | 0 | 1 | 1 | Pm | 1 | 1 | 0 |
| s1 | 1 | 0 | 0 | Ps | 1 | 0 | 0 |
| s2 | 1 | 0 | 1 | Ps | 1 | 0 | 0 |
| w1 | 1 | 1 | 0 | Pw | 1 | 1 | 1 |
| c2 | 1 | 1 | 1 | Pc | 0 | 0 | 0 |

| Control code | | | | Mapped Power | Switch on/off | | |
|---|---|---|---|---|---|---|---|
| Code name | WEN1 | WEN2 | WEN3 | symbol | OE1 | OE2 | OE3 |
| c1 | 0 | 0 | 0 | Pc | 0 | 0 | 0 |
| w2 | 0 | 0 | 1 | Pw | 1 | 1 | 1 |
| m1 | 0 | 1 | 0 | Pm | 1 | 1 | 0 |
| m2 | 0 | 1 | 1 | Pm | 1 | 1 | 0 |
| c4 | 1 | 0 | 0 | Pc | 0 | 0 | 0 |
| c3 | 1 | 0 | 1 | Pc | 0 | 0 | 0 |
| w1 | 1 | 1 | 0 | Pw | 1 | 1 | 1 |
| c2 | 1 | 1 | 1 | Pc | 0 | 0 | 0 |

FIG. 12

CONTROLLER AND METHOD EMPLOYED IN OPTICAL STORAGE APPARATUS FOR GENERATING CONTROL SIGNALS EACH HAVING MINIMUM TRANSMISSION PULSE LENGTH CORRESPONDING TO MORE THAN ONE POWER SYMBOL PERIOD

This application claims the benefit of U.S. Provisional Application No. 61/153,352, filed on Feb. 18, 2009 and incorporated herein by reference.

FIELD OF INVENTION

The present invention relates to write pulse transmission between a controller and a laser diode driver, and more particularly, to a controller and method employed in an optical storage apparatus (e.g., an optical disc drive) for generating a plurality of control signals (e.g., at least three write enable signals) each having minimum transmission pulse width corresponding to more than one power symbol period.

BACKGROUND OF THE INVENTION

Optical discs have become popular storage media nowadays. An optical storage apparatus, such as an optical disc drive, is therefore equipped with the data recording capability to record user data onto an optical storage medium, such as an optical disc. In general, a laser diode driver (LDD) is electrically connected between a controller and a laser diode for receiving driving and control signals generated from the controller to drive a laser diode (LD) to emit a laser beam with a designated laser power for data recording. FIG. 1 is a block diagram illustrating a conventional laser diode driving system 100. As one can see, the exemplary LDD 104 includes a plurality of current amplifiers 112_1, 112_2, 112_3 and a plurality of switches 114_1, 114_2, 114_3. The controller 102 outputs driving currents IIN1, IIN2, IIN3 to the current amplifiers 112_1, 112_2, 112_3, respectively; in addition, the controller 102 generates write enable signals WEN1, WEN2, WEN3 to the LDD 104 to serve as output enable signals OE1, OE2, OE3 which control on/off states of the respective switches 114_1, 114_2, 114_3. With proper control of the switches 114_1, 114_2, 114_3, the amplified currents generated from the current amplifiers 112_1, 112_2, 112_3 are selectively combined at the output node N to drive the following LD 106 to emit a laser beam with a specific laser power P which is in proportion to the LD driving current received from the output node N.

Please refer to FIG. 2, which is a waveform diagram illustrating the laser power P (or the LD driving current) and the write enable signals WEN1, WEN2, WEN3. Taking a Blu-ray disc (BD) for example, the adopted write strategy supports power shape types including a block type, an L-shape type and a castle type. As shown in FIG. 2, the power symbols include a cooling power Pc, a space power Ps, a write power Pw, and a middle power Pm. For clarity and simplicity, each power symbol (power level) has duration equal to 1T (i.e., one power symbol period is 1T). Regarding the conventional write pulse transmission design, a minimum transmission pulse width equal to 1T may occur. For example, to produce the desired power shape type (i.e., block type, L-shape type or castle type), the length of the high transmission pulse of the write enable signal WEN2 between $T_1$ and $T_2$ is required to be 1T; regarding the write enable signal WEN1, the length of one low transmission pulse between $T_2$ and $T_3$, the length of another low transmission pulse between $T_6$ and $T_7$, and the length of yet another low transmission pulse between $T_{11}$ and $T_{12}$ are required to be 1T; additionally, regarding the write enable signal WEN3, the length of a first high transmission pulse between $T_1$ and $T_2$, the length of a second high transmission pulse between $T_4$ and $T_5$, the length of a third high transmission pulse between $T_8$ and $T_9$, and the length of a fourth high transmission pulse between $T_{10}$ and $T_{11}$ are required to be 1T. As the controller 102 is generally an unmovable control chip disposed in the optical storage apparatus, and the LDD 104 and LD 106 are disposed on a movable optical pick-up head of the optical storage apparatus, a flex cable is therefore used to electrically connect the controller 102 to the LDD 104. However, in a case where the high-speed data recording is enabled, the transmission period of 1T may be 1.26 ns or less, which is shorter than the flex cable's minimum transmission pulse period, say, 2 ns. Therefore, the effective bandwidth of the flex cable fails to meet the requirements for transmitting 1T short transmission pulses generated under the high-speed data recording operation, leading to poor signal transmission quality between the controller 102 and the LDD 104. As a result, the write quality is significantly degraded because the switches 114_1, 114_2, 114_3 cannot be accurately controlled to make the LD 106 produce laser pulses with the desired power shape.

Due to factors deteriorating the transmission quality including the impedance discontinuity and the signal loss and crosstalk of the flex cable connected between the controller and the LDD, it is better to avoid the delivery of any short transmission pulses (e.g., 1T transmission pulses) from the controller to the LDD. Therefore, an innovative scheme of transmitting the control signals, such as the write enable signals, via the flex cable connected between the controller and the LDD is needed.

SUMMARY OF THE INVENTION

In accordance with exemplary embodiments of the present invention, a controller and method employed in an optical storage apparatus (e.g., an optical disc drive) for generating a plurality of control signals (e.g., at least three write enable signals) each having minimum transmission pulse width corresponding to more than one power symbol period are proposed.

According to one aspect of the present invention, a controller of an optical storage apparatus for generating a plurality of control signals is disclosed. The controller includes a code generator implemented for determining a plurality of control codes according to an input data associated with data recording, and generating the control signals to deliver the control codes. Each of the control codes represents at least one power level. Besides, regarding each of the control signals, a minimum transmission pulse length thereof corresponds to more than one power symbol period.

According to another aspect of the present invention, a method employed in an optical storage apparatus for generating a plurality of control signals is disclosed. The method includes: determining a plurality of control codes according to an input data associated with data recording, wherein each of the control codes represents at least one power level; and generating the control signals to deliver the control codes, wherein regarding each of the control signals, a minimum transmission pulse length thereof corresponds to more than one power symbol period.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 5 shows one implementation of a code table shown in FIG. 4.

FIG. 11 shows an exemplary implementation of a first look-up table shown in FIG. 10.

FIG. 12 shows an exemplary implementation of a second look-up table shown in FIG. 10.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

To put it simply, the present invention proposes a controller and related method of an optical storage apparatus for generating a plurality of control signals by: determining a plurality of control codes according to information transmitted via an input data associated with data recording, where each of the control codes corresponds to a power symbol (power level), and generating the control signals to deliver the control codes, where bits of each of the control codes are respectively delivered via the control signals, and in each of the control signals, a minimum transmission pulse length corresponds to more than one power symbol period. To more clearly describe technical features of the present invention, certain exemplary embodiments are given as follows.

Figure 1:
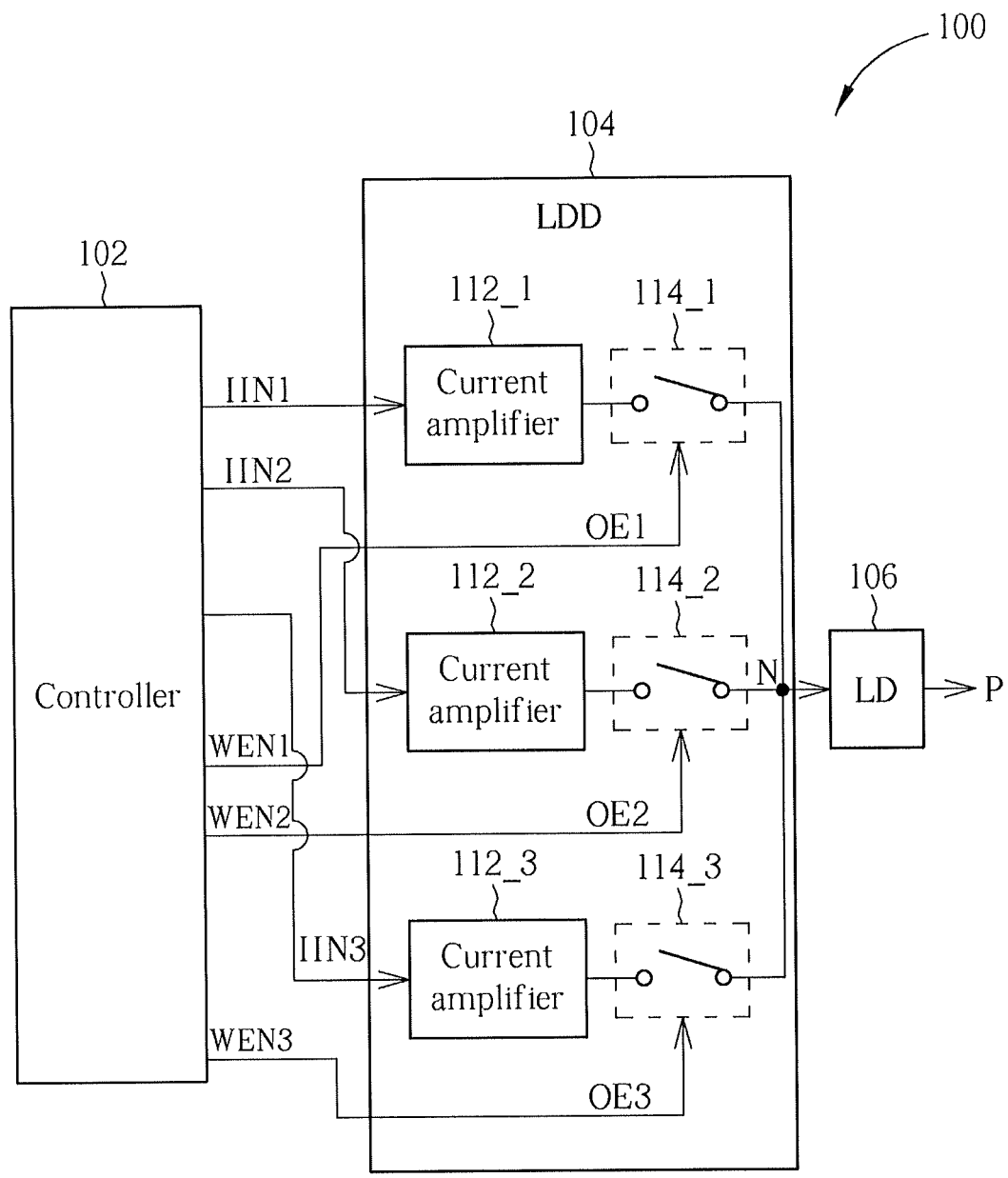
FIG. 1 is a block diagram illustrating a conventional laser diode driving system.
Figure 2:
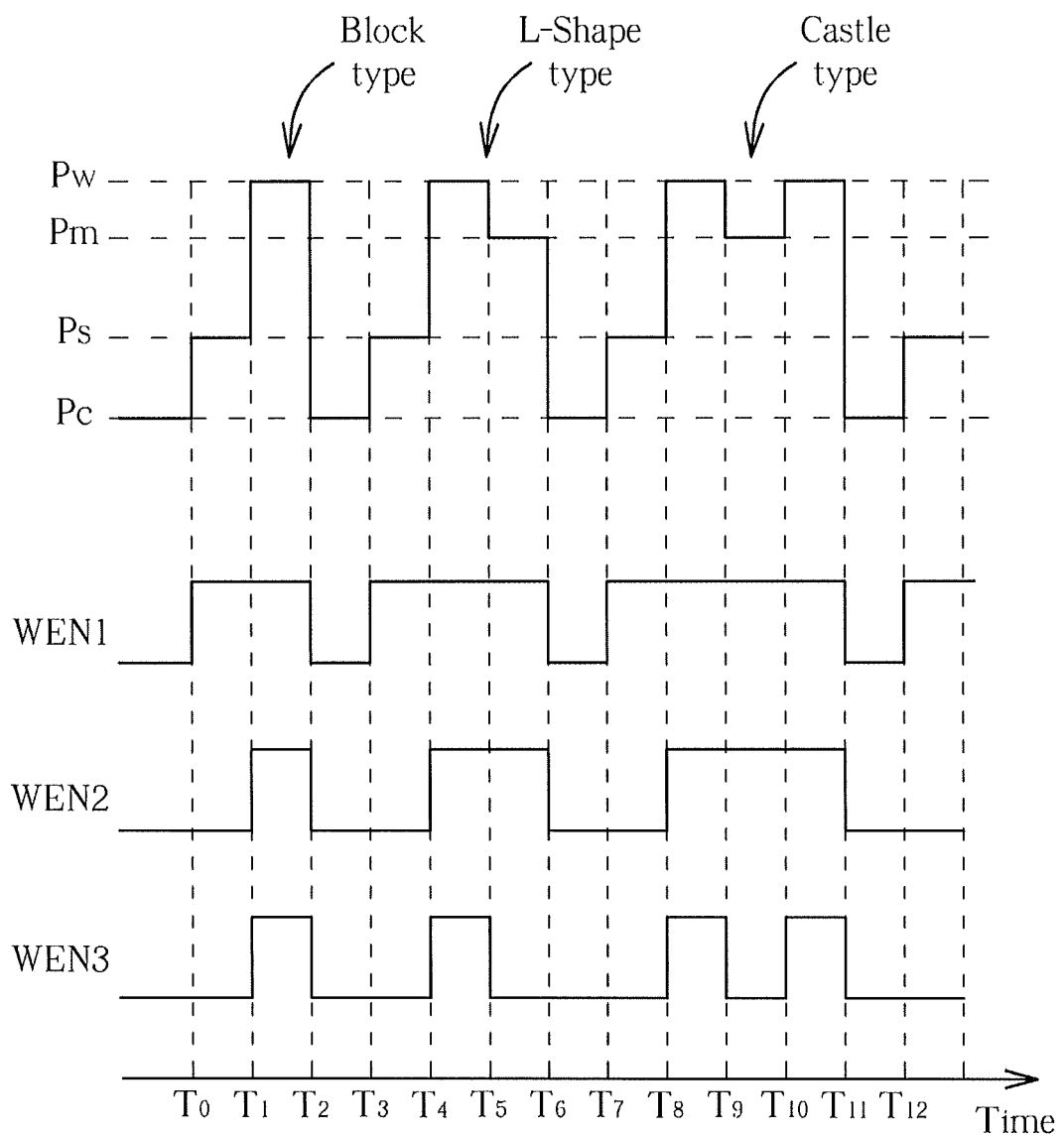
FIG. 2 is a waveform diagram illustrating the laser power (or the laser diode driving current) and the write enable signals according to the related art.
Figure 3:
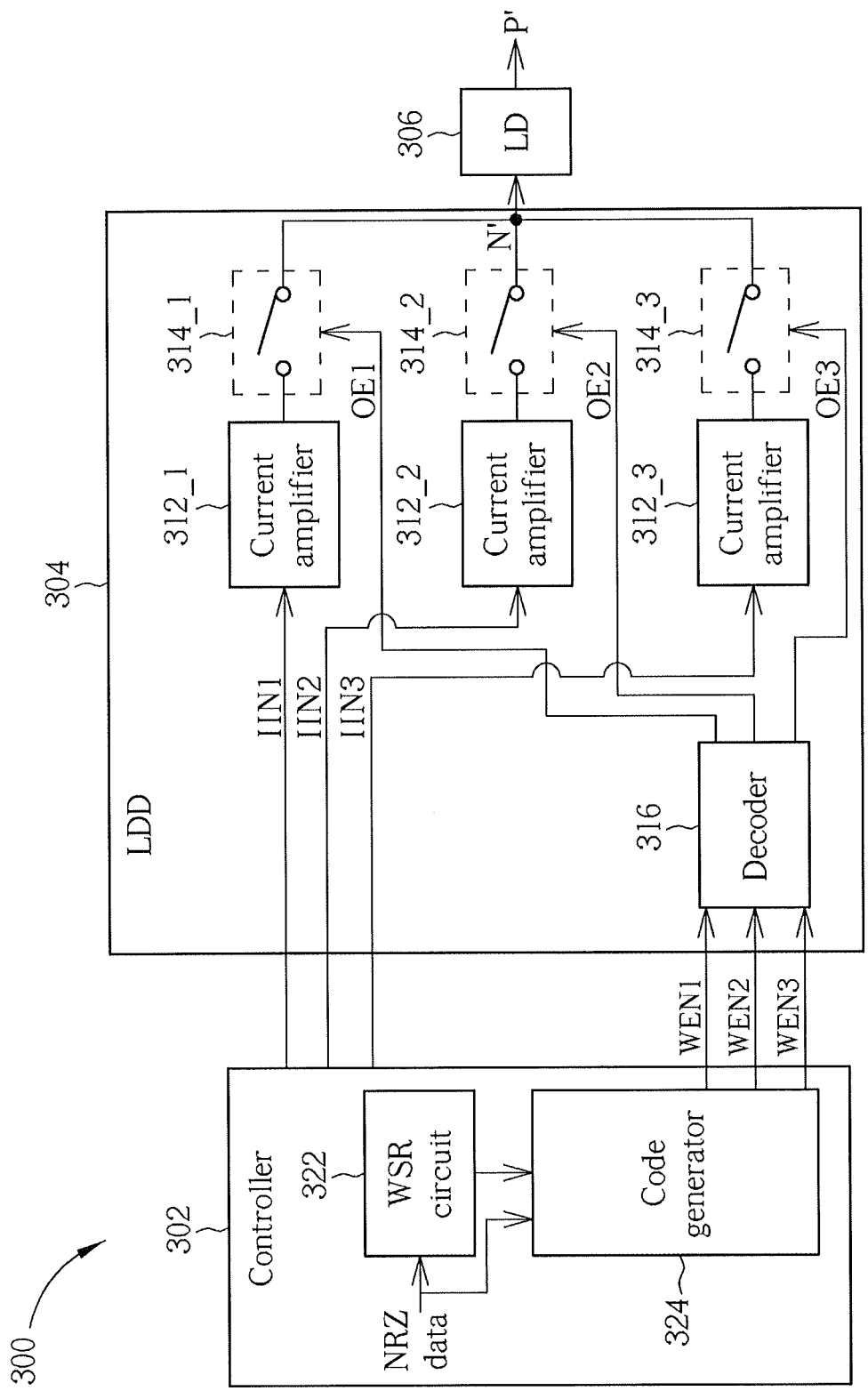
FIG. 3 is a block diagram illustrating a laser diode driving system which employs an exemplary controller of the present invention.

FIG. 3 is a block diagram illustrating a laser diode driving system 300 which employs an exemplary controller 302 of the present invention. The controller (e.g., a control chip of an optical storage apparatus) 302 includes, but is not limited to, a write strategy (WSR) circuit 322 and a code generator 324 coupled to the WSR circuit 322. The code generator 324 serves as an encoder configured to refer to an input data, either the non-return-to zero (NRZ) data (i.e., data to be recorded) or an output generated from the WSR circuit 322 through processing the NRZ data, for sequentially determining a plurality of control codes according to information transmitted via the input data associated with data recording, where each of the control codes corresponds to one power symbol (power level), such as a cooling power Pc, a space power Ps, a write power Pw, or a middle power Pm. Besides, the code generator 324 is also implemented for generating at least three control signals WEN1, WEN2, WEN3 to sequentially deliver the control codes, where bits of each of the control codes are respectively delivered via the control signals WEN1, WEN2, WEN3. Particularly, regarding each of the control signals WEN1, WEN2, WEN3 in this exemplary embodiment of the present invention, a minimum transmission pulse length corresponds to more than one power symbol period. More specifically, in one preferred implementation, the minimum transmission pulse length corresponds to at least two power symbol periods to effectively alleviate the undesired effects caused by the flex cable connected between the controller 302 and the LDD 304.

In addition to current amplifiers 312_1, 312_2, 312_3 and switches 314_1, 314_2, 314_3, the LDD 304 includes a decoder 316 for receiving each control code having bits respectively transmitted via the control signals WEN1, WEN2, WEN3. When receiving one control code generated from the controller 302, the decoder 316 decodes the received control code to set the output enable signals OE1, OE2, OE3 for selectively switching on or switching off the respective switches 314_1, 314_2, 314_3. In this way, the LD 306 is driven to generate a laser beam with a designated laser power P' in response to the LD driving current at the output node N'. As the output enable signals OE1, OE2, OE3 are generated from the decoder 316 included in the LDD 304, rather than generated from the controller 302 and then transmitted via the flex cable, the output enable signals OE1, OE2, OE3 can meet the requirements of the high-speed data recording operation. Besides, in this exemplary embodiment, the code generator 324 is configured to properly set each code transmitted via the flex cable so that there is no short transmission pulse (i.e., 1T transmission pulse) included in the control signals WEN1, WEN2, WEN3. In other words, the code generator 324 is implemented to guarantee that a minimum transmission pulse length must correspond to more than one power symbol period. In this way, as the signal transmission quality of the control signals WEN1, WEN2, WEN3 will not be significantly degraded due to limited bandwidth of the flex cable, the write quality can be improved accordingly.

It should be noted that the exemplary implementation of the LDD 304 shown in FIG. 3 is for illustrative purposes only. Other LDD implementations which can generate the desired LD driving current based on the control code delivered via control signals generated from the exemplary controller 302 of the present invention are feasible.

Figure 4:
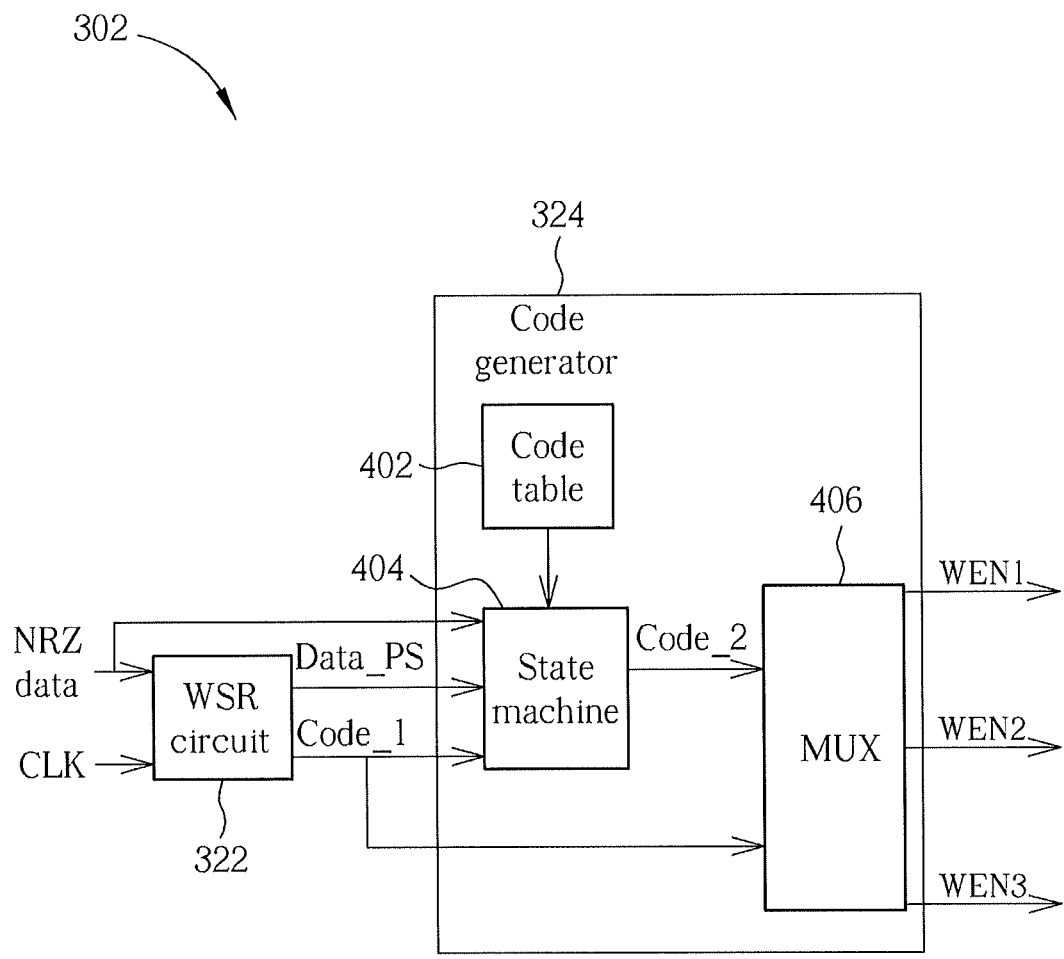
FIG. 4 is a block diagram illustrating an exemplary implementation of the controller shown in FIG. 3.

FIG. 4 is a block diagram illustrating an exemplary implementation of the controller 302 shown in FIG. 3. In this exemplary implementation, the WSR circuit 322 processes data to be recorded (i.e., the NRZ data) according to a reference clock CLK, and is capable of deriving power shape data Data_PS which are indicative of the power shape types (e.g., a block type, an L-shape type, and a castle type as defined in the Blu-ray disc specification) to be used and generating input codes Code_1 which are indicative of power levels (e.g., a cooling power, a space power, a write power, and a middle power) to be used. The code generator 324 includes, but is not limited to, a code table 402, a state machine 404 and a multiplexer (MUX) 406, and selectively uses the NRZ data, the power shape data Data_PS, or the input codes Code_1 as an input data to thereby determine the control codes Code_2. In this exemplary implementation, the code table 402 and the state machine 404 are individual functional blocks. In this way, the code table 402 external to the state machine 404 is programmable, and can be programmed easily when needed. However, in an alternative design, the code table 402 can be integrated in the state machine 404 to simplify the overall hardware implementation. This also obeys the spirit of the present invention.

Figure 6:
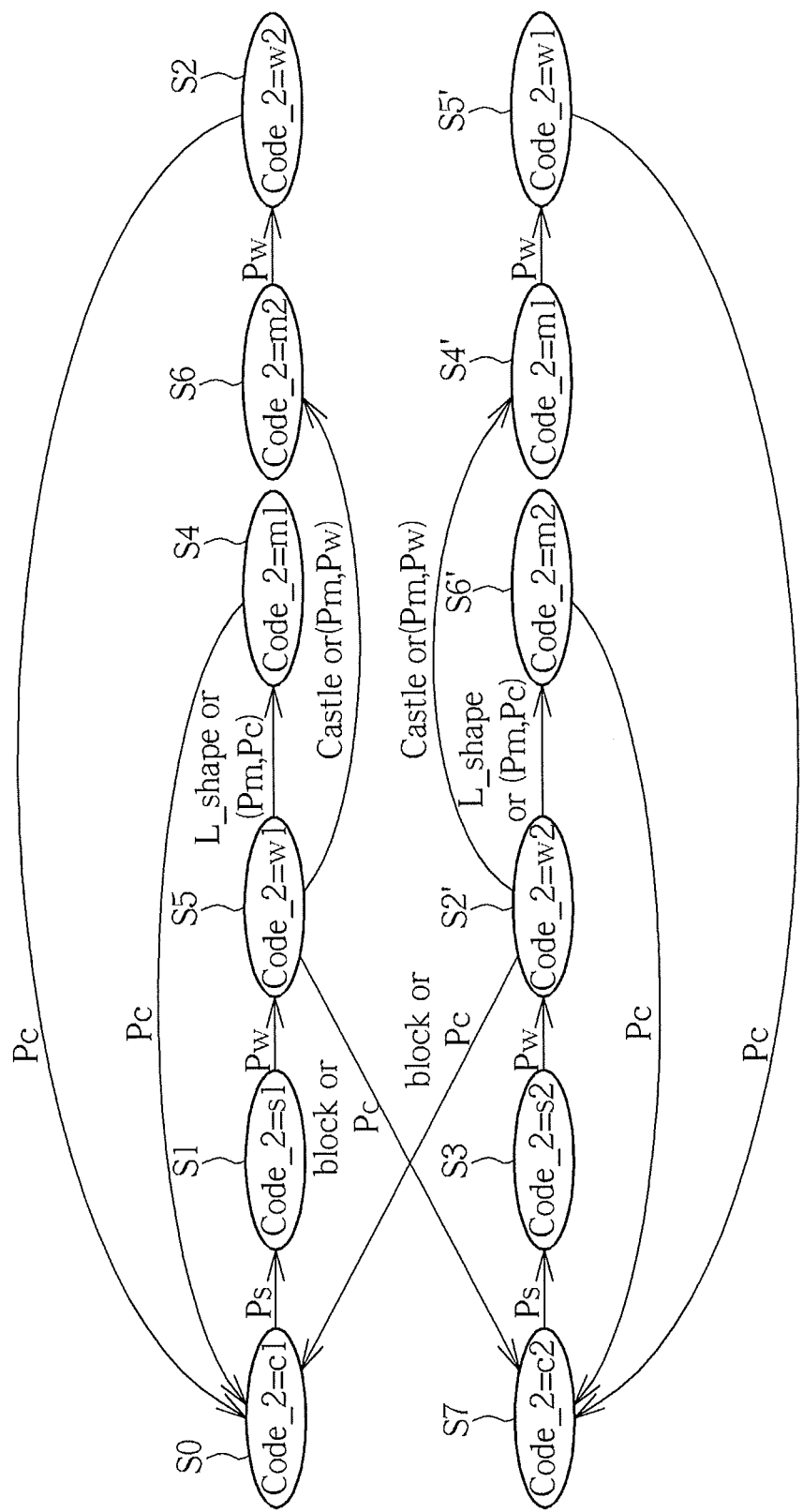
FIG. 6 shows a first exemplary state diagram of a state machine shown in FIG. 4.

The state machine 404 is operated according to the input data (i.e., the NRZ data, the power shape data Data_PS, or the input codes Code_1), and has a plurality of states respectively corresponding to a plurality of control codes, respectively. Therefore, the state machine 404 outputs a specific control code of a specific state when entering the specific state according to the input data. The code table 402 is implemented for storing control codes mapped to the states. In this exemplary implementation, the state machine 404 requests the code table 402 for the specific control code mapped to the specific state when entering the specific state. FIG. 5 shows one implementation of the code table 402 shown in FIG. 4, and FIG. 6 shows a first exemplary state diagram of the state machine 404 shown in FIG. 4. When the state machine 404 enters the state S0, a corresponding control code outputted to the multiplexer 406 will be Code_2=c1=000'b (i.e., binary code 000). Next, when there is a power transition (i.e., a transition from the cooling power Pc to the space power Ps), the state machine 404 leaves the current state S0 and enters the next state S1. Accordingly, a corresponding control code outputted to the multiplexer 406 will be Code_2=s1=001'b.

Similarly, when there is a power transition (i.e., a transition from the space power Ps to the write power Pw), the state machine 404 leaves the current state S1 and enters the next state S5. Accordingly, a corresponding control code outputted to the multiplexer 406 will be Code_2=w1=101'b. As shown in FIG. 6, there are three possible paths (power transitions) from the same state S5 to different states S4, S6, S7. In one implementation, a power shape type corresponding to the next control code is determined according to the power shape data Data_PS, and the state machine 404 enters a proper state to set the next control code according to the determined power shape type. For example, the state machine 404 leaves the current state S5 and enters the next state S4 if the power shape type is the L-shape type, the state machine 404 leaves the current state S5 and enters the next state S6 if the power shape type is the castle type, and the state machine 404 leaves the current state S5 and enters the next state S7 if the power shape type is the block type.

Generally speaking, T-patterns of the NRZ data are related to the used power shape types. For example, the power shape with a block type is used for recording a 2T pattern, the power shape with an L-shape type is used for recording a 3T pattern, and the power shape with a castle type is used for recording a pattern selected from a group consisting of 4T-9T patterns. The T-pattern therefore can also be used to decide the path (state transition) from one state to another state. In another implementation, a T-pattern corresponding to the next control code is determined according to the data to be recorded (i.e., the NRZ data), and the state machine 404 enters a proper state to set the next control code according to the determined T-pattern. For instance, the state machine 404 leaves the current state S5 and enters the next state S4 if the determined T-pattern is a 2T pattern which implies that a power shape with a block type will be used correspondingly, the state machine 404 leaves the current state S5 and enters the next state S6 if the determined T-pattern is a 3T pattern which implies that a power shape with an L-shape type will be used correspondingly, and the state machine 404 leaves the current state S5 and enters the next state S7 if the determined T-pattern is one of 4T-9T patterns which implies that a power shape with a castle type will be used correspondingly.

In yet another implementation, a look-ahead scheme is employed to decide the state transition. Assume that the state machine 404 is currently staying at a current state S5 for outputting a current control code Code_2=w1. If a current power transition is from the current write power Pw to the next cooling power Pc, the state machine 404 leaves the current state S5 and enters the next state S7 without considering a next power transition immediately following the current power transition. However, if the current power transition is from the current write power Pw to the next middle power Pm, there are two possible state transition options, i.e., S5->S4 and S5->S6. Therefore, the look-ahead scheme is active to take the next power transition, either from the middle power Pm to the cooling power Pc or from the middle power Pm to the write power Pw, into consideration for deciding the actual state transition. In this implementation, the state machine 404 refers to the input codes Code_1 to determine at least one second input code following a first input code corresponding to the next control code, and enters a proper state to set the next control code according to the at least one second input code. For example, when the first input code and the second input code following the first input code are indicative of middle power Pm and cooling power Pc, respectively, the state machine 404 therefore leaves the current state S5 and enters the next state S4; on the other hand, when the first input code and the second input code following the first input code are indicative of middle power Pm and write power Pw, respectively, the state machine 404 leaves the current state S5 and enters the next state S6.

As a person skilled in the art can readily understand the state transitions of other states shown in FIG. 6 after reading above paragraphs, further description is omitted here for brevity.

The multiplexer 406 shown in FIG. 4 is responsible for outputting the control signals WEN1, WEN2, WEN3 to deliver each control code Code_2 generated from the state machine 404. As clearly shown in FIG. 5, bits of each control code Code_2 are respectively delivered via the control signals WEN1, WEN2, WEN3 generated from the state machine 404. With the proper design of the control codes assigned to the power symbols Pc, Ps, Pw, Pm, where each power symbol has two different control codes assigned thereto, a minimum transmission pulse length of the control signals WEN1, WEN2, WEN3 is guaranteed to correspond to more than one power symbol period. Please refer to FIG. 7, which is a waveform diagram illustrating the laser power P (or the LD driving current) and the control signals WEN1, WEN2, WEN3 generated from the controller 302. Taking a Blu-ray disc for example, the adopted write strategy supports power shape types including a block type, an L-shape type and a castle type. For clarity and simplicity, each power symbol has duration equal to 1T. That is, one power symbol period is 1T. As one can see from FIG. 7, each of the transmission pulses, including high transmission pulses and low transmission pulses, has a length equal to or longer than 2T in this exemplary embodiment. That is, each of the transmission pulses corresponds to at least two power symbol periods. For instance, the high transmission pulse of the control signal WEN1 between $T_1$ and $T_3$ corresponds to two power symbols Pw and Pc, and the low transmission pulse of the control signal WEN1 between $T_3$ and $T_5$ corresponds to two power symbols Ps and Pw.

Figure 7:
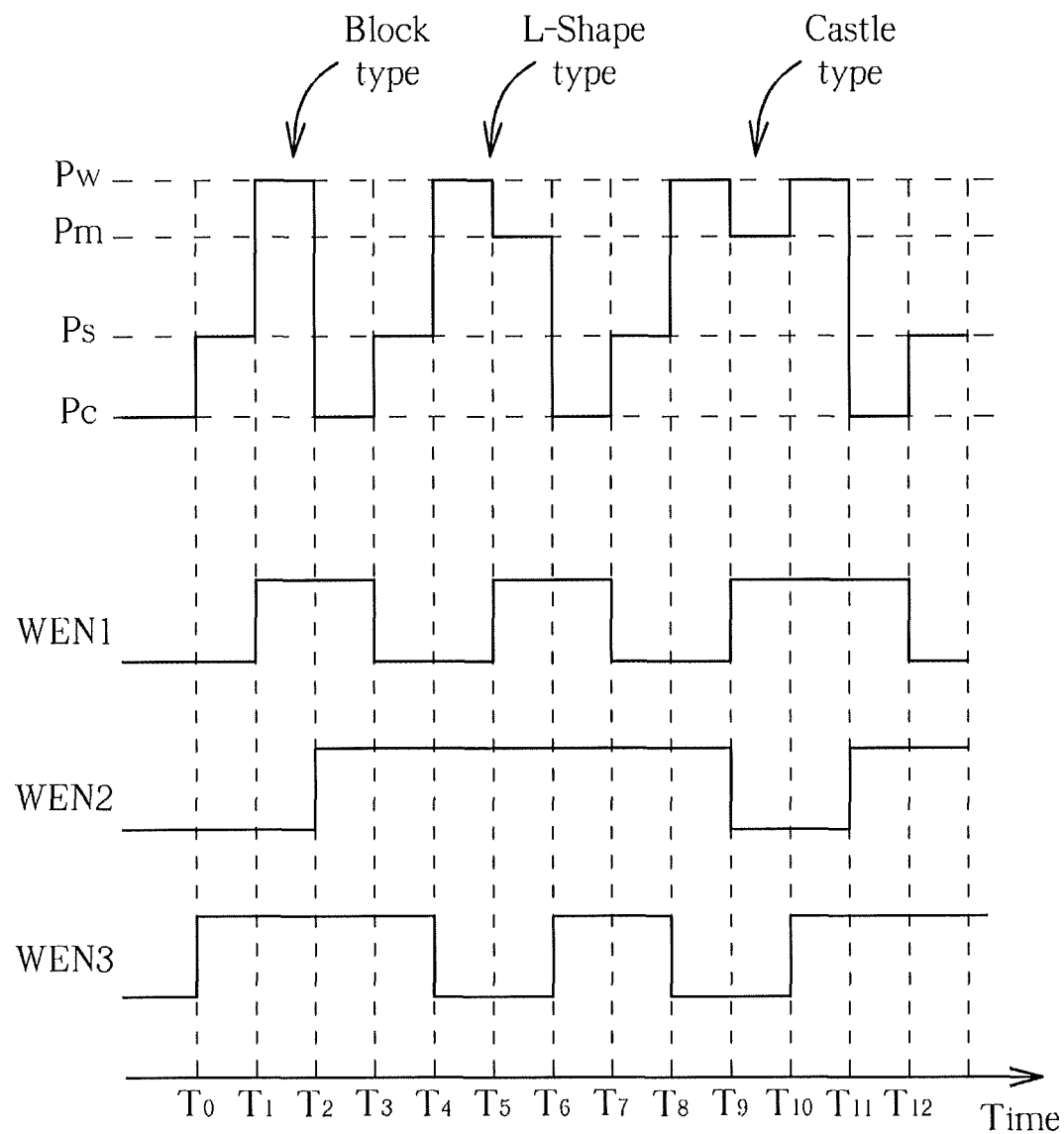
FIG. 7 is a waveform diagram illustrating the laser power (or the laser diode driving current) and the control signals generated from the controller.
Figure 8:
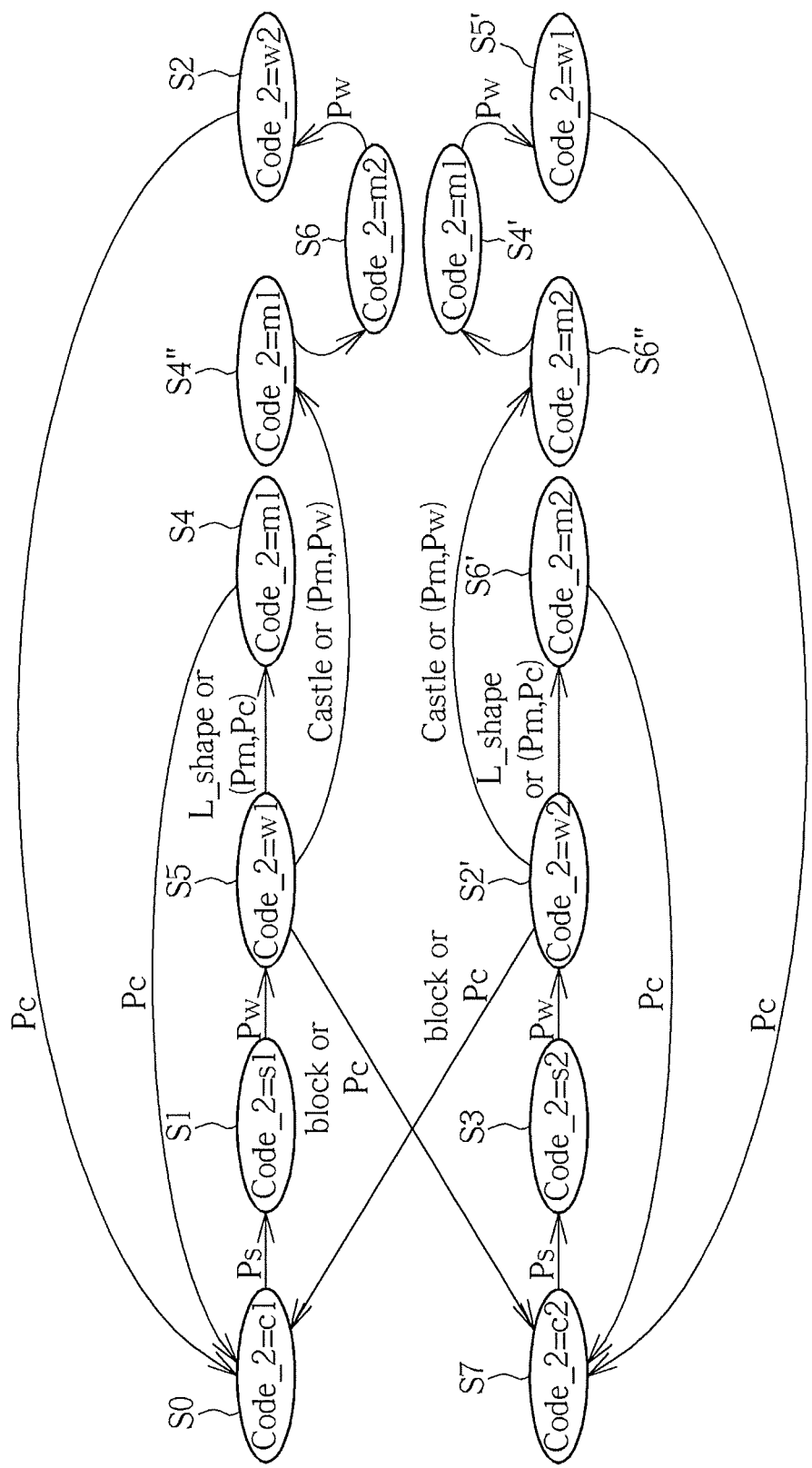
FIG. 8 shows a second exemplary state diagram of the state machine shown in FIG. 4.

As shown in FIG. 7, at the time point $T_9$, the control signal WEN1 has a transition from logic low (i.e., "0") to logic high (i.e., "1"), and the control signal WEN2 has a transition from logic high to logic low. In other words, the 3-bit control code has two bits changed simultaneously, which may lead to a glitch problem under certain conditions. To solve this problem, additional states are added to the state diagram shown in FIG. 6. Please refer to FIG. 8, which shows a second exemplary state diagram of the state machine 404 shown in FIG. 4. One state S4" is inserted between states S5 and S6, and another state S6" is inserted between states S2' and S4'. It should be noted that the control codes for the states S4" and S6 correspond to the same power symbol (power level) Pm, and the control codes for the states S6" and S4' correspond to the same power symbol (power level) Pm. Therefore, when the state machine 404 decides to leave the state S5 due to a required power transition from write power Pw to middle power Pm, the state machine 404 enters the state S4" temporarily before entering the state S6; similarly, when the state machine 404 decides to leave the state S2' due to a required power transition from write power Pw to middle power Pm, the state machine 404 enters the state S6" temporarily before entering the state S4'. As the state machine 404 stays at the intermediate state S4" or S6" in a short period, the minimum transmission pulse length is slightly shorter than a length corresponding to two power symbol periods, but still corresponds to more than one power symbol period. Compared to the conventional design, such an exemplary embodiment still effectively mitigates the undesired effects caused by the flex cable connected between the controller 302 and the LDD 304.

As shown in FIG. 4, the multiplexer 406 also receives the input codes Code_1 indicative of the power levels from the WSR circuit 322. Therefore, the multiplexer 406 determines the final control signals WEN1, WEN2, WEN3 according to either an output of the state machine 404 or an output of the WSR circuit 322, where bits of each of the control codes Code_1 and Code_2 are respectively delivered via control signals generated from the WSR circuit 322 and the state machine 404. In this embodiment, the controller 302 is configured to support the novel control signal transmission scheme proposed in the present invention which guarantees that the minimum transmission pulse length corresponding to more than one power symbol period and the conventional control signal transmission scheme which may include short transmission pulse. This increases the flexibility in the use of the controller 302. That is, the controller 302 can selectively use the novel control signal transmission scheme or the conventional control signal transmission scheme, depending upon actual application requirements. It should be noted that such a design is for illustrative purposes, and is not meant to be a limitation to the scope of the present invention. Any controller employing the novel control signal transmission scheme proposed in the present invention falls within the scope of the present invention. By way of example, not limitation, the multiplexer 406 is an optional element, and can be omitted in an alternative design where the novel control signal transmission scheme proposed in the present invention is employed by the controller 302 only.

Please note that mapping between the control codes and the power symbols (power levels) as shown in FIG. 5 merely serves as one example. Provided that the result is substantially the same, other code table design can be employed. For example, the mapping between the control codes and the power symbols (power levels) can be set according to one code table selected from following exemplary code table set, where the code values in decimal format include 0-7. Please note that only five code tables are illustrated for simplicity; however, this by no means implies that the total number of all available code tables is limited to 5.

| Symbols | Pc | | Ps | | Pw | | Pm | |
|---|---|---|---|---|---|---|---|---|
| Code Name | c1 | c2 | s1 | s2 | w1 | w2 | m1 | m2 |
| Code Table 1 | 0 | 7 | 1 | 3 | 5 | 2 | 4 | 6 |
| Code Table 2 | 0 | 7 | 1 | 5 | 3 | 4 | 2 | 6 |
| Code Table 3 | 0 | 7 | 2 | 3 | 6 | 1 | 4 | 5 |
| Code Table 4 | 0 | 7 | 4 | 5 | 6 | 1 | 2 | 3 |
| Code Table 5 | 0 | 7 | 2 | 6 | 3 | 4 | 1 | 5 |

Figure 9:
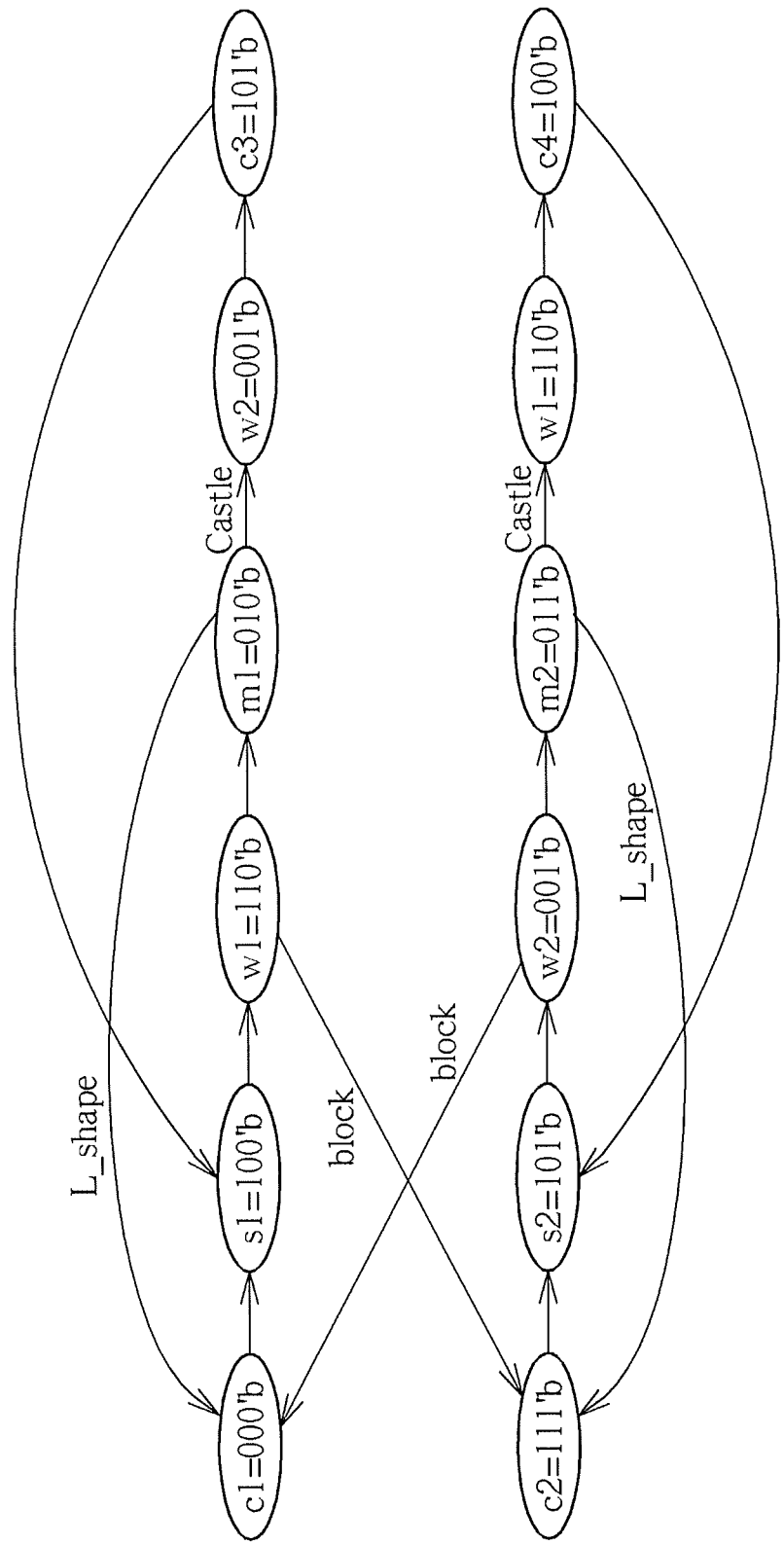
FIG. 9 shows a third exemplary state diagram of the state machine shown in FIG. 4.
Figure 10:
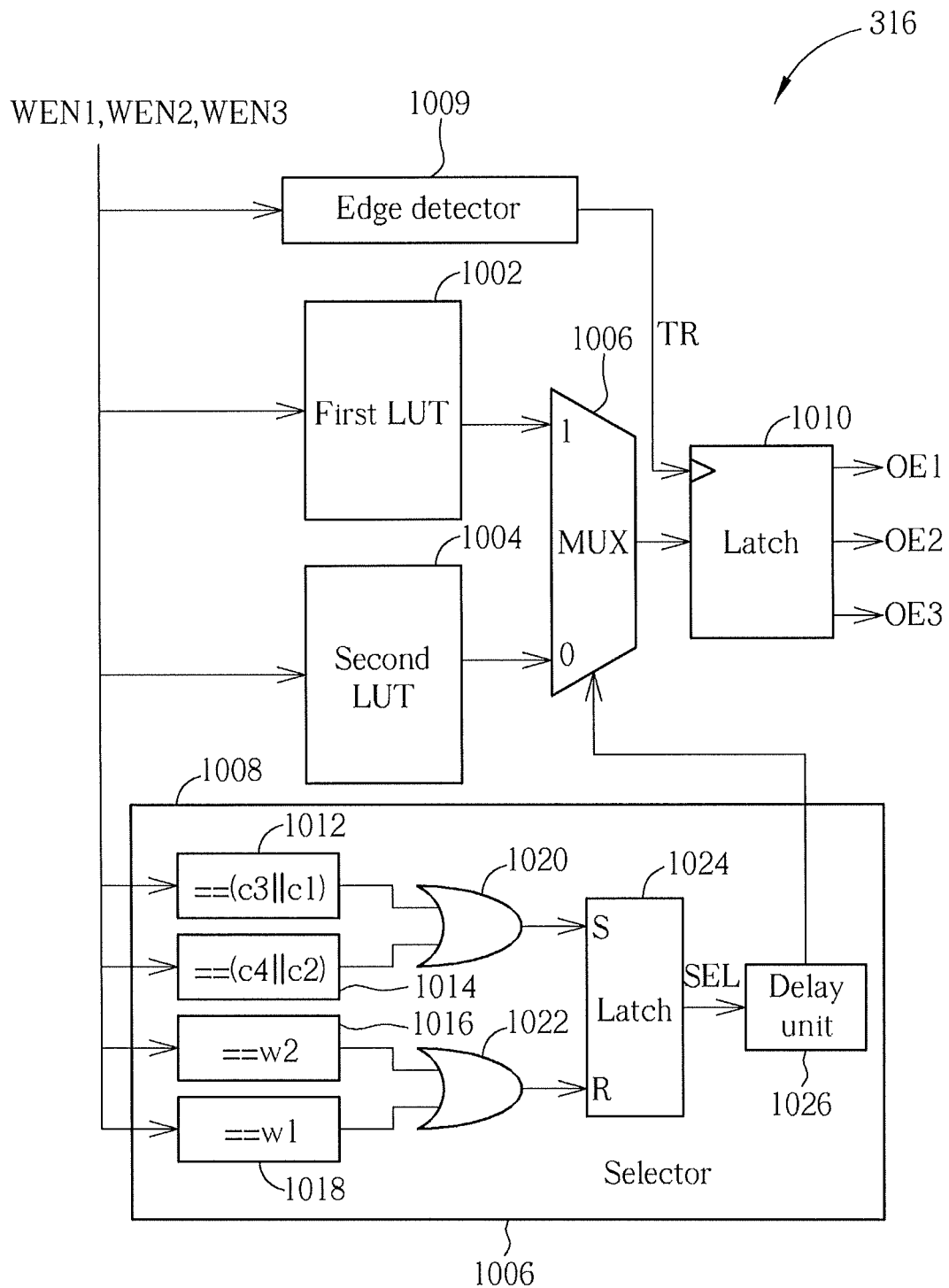
FIG. 10 is a diagram illustrating an exemplary implementation of a decoder shown in FIG. 3.

In above exemplary embodiments, each control code is assigned to one power symbol (power level) according to a one-to-one mapping rule. However, with proper modification made to the decoder 316 shown in FIG. 3, mapping one control code to a plurality of different power symbols (power levels) is feasible. FIG. 9 shows a third exemplary state diagram of the state machine 404 shown in FIG. 4. The control codes c1, c2, c3 and c4 are mapped to the power symbol (power level) Pc, the control codes s1 and s2 are mapped to the power symbol (power level) Ps, the control codes m1 and m2 are mapped to the power symbol (power level) Pm, and the control codes w1 and w2 are mapped to the power symbol (power level) Pw. As can be seen from FIG. 9, the control codes s1 and c4 are identical to each other (i.e., s1=c4=100'b), and the control codes s2 and c3 are identical to each other (i.e., s2=c3=101'b). As the mapping between the control code and the power symbol (power level) does not follow the one-to-one mapping rule, the decoder 316 therefore needs additional information to decode the received control code correctly. For example, the decoder 316 employs a look-backward scheme when decoding the incoming control codes. Specifically, in a case where the received control code is 100'b (or 101'b), the decoder 316 determines that the power symbol mapped to the received control code is Ps when a previous control code or state corresponds to c1/c3 (or c2/c4) or the previous power symbol is Pc; on the other hand, the decoder 316 determines that the power symbol mapped to the received control code is Pc when a previous control code or state corresponds to w1 (or w2) or the previous power symbol is Pw. Please refer to FIG. 10 in conjunction with FIG. 11 and FIG. 12. FIG. 10 is a diagram illustrating an exemplary implementation of the decoder 316 shown in FIG. 3. FIG. 11 shows an exemplary implementation of a first look-up table shown in FIG. 10. FIG. 12 shows an exemplary implementation of a second look-up table shown in FIG. 10. As shown in FIG. 10, the exemplary decoder 316 includes a first look-up table (LUT) 1002, a second LUT 1004, a multiplexer (MUX) 1006, a selector 1008, an edge detector 1009, and a latch 1010. The selector 1008 includes a plurality of decision logics 1012-1018, a plurality of logic gates (e.g., OR gates) 1020 and 1022, a latch 1024, and a delay unit 1026. The decision logics 1012 and 1014 are implemented to detect if the first LUT 1002 should be used for decoding following control codes transmitted by the control signals WEN1-WEN3, and the decision logics 1016 and 1018 are implemented to detect if the second LUT 1004 should be used for decoding following control codes transmitted by the control signals WEN1-WEN3. The delay unit 1026 is implemented to delay the selection signal SEL generated from the latch 1024 to the multiplexer 1006. Therefore, the timing of switching between the first LUT 1002 and the second LUT 1004 is between the timing when the current control code (e.g., c1/c2/c3/c4 or w1/w2) arrives at the decoder 316 and the timing when the next control code (e.g., s1/s2 or c3/c4) arrives at the decoder 316. Bits of each of the mapped control code found in the selected look-up table are respectively delivered via output enable signals to the multiplexer 1006. The selection signal SEL generated from the selector 1006 controls the multiplexer 1006 to couple an input node which receives an output of the selected look-up table to an output node which is electrically connected to the latch 1010. The latch 1010 is used to refer to an output of the multiplexer 1006 for generating the final output enable signals OE1, OE2, OE3 to the switches 314_1, 314_2, 314_3, respectively; however, it should be noted that the latch 1010 in this embodiment does not change the output enable signals OE1, OE2, OE3 according to the output of the multiplexer 1006 unless triggered by a trigger signal TR generated from the edge detector 1009. Specifically, the edge detector 1009 is used to perform control code transition detection (or WEN's edge detection) according to the incoming control signals WEN1-WEN3, and generates the trigger signal TR upon detecting a control code transition (or a WEN's edge). In this way, the actual laser power P' of the LD 306 shown in FIG. 3 is changed only when a power transition is actually needed.

FIG. 9 shows that certain state transitions are controlled according to the power shapes (e.g., block type, L-shape type, and castle type as defined in the Blu-ray disc specification); however, any decision rule mentioned above can be implemented to control the state transition from a current state to a next state when the current state in the state diagram has multiple state transition options. These alternative designs all fall within the scope of the present invention.

Please note that mapping between the control codes and the power symbols (power levels) as shown in FIG. 5 merely serves as one example. Provided that the result is substantially the same, other code table design can be employed. For example, the mapping between the control codes and the power symbols (power levels) can be set according to one code table selected from following exemplary code table set, where the code values in decimal format include 0-7. Please note that only five code tables are illustrated for simplicity; however, this by no means implies that the total number of all available code tables is limited to 5.

| Symbols | Pc | | Ps | | Pw | | Pm | |
|---|---|---|---|---|---|---|---|---|
| Code Name | c1 | c2 | s1 | s2 | w1 | w2 | m1 | m2 |
| Code Table 1 | 0 | 7 | 1 | 3 | 5 | 2 | 4 | 6 |
| Code Table 2 | 0 | 7 | 1 | 5 | 3 | 4 | 2 | 6 |
| Code Table 3 | 0 | 7 | 2 | 3 | 6 | 1 | 4 | 5 |
| Code Table 4 | 0 | 7 | 4 | 5 | 6 | 1 | 2 | 3 |
| Code Table 5 | 0 | 7 | 2 | 6 | 3 | 4 | 1 | 5 |

Figure 13:
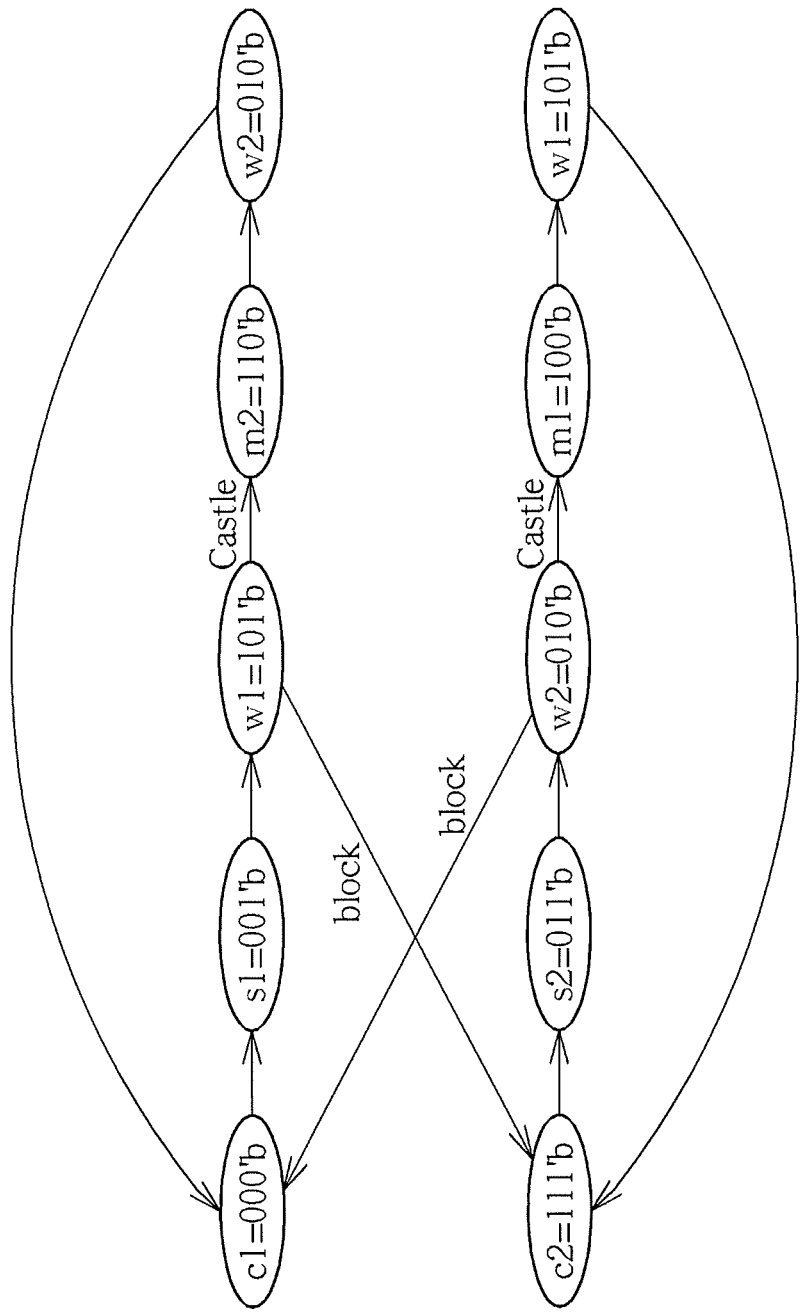
FIG. 13 shows a fourth exemplary state diagram of the state machine shown in FIG. 4.
Figure 14:
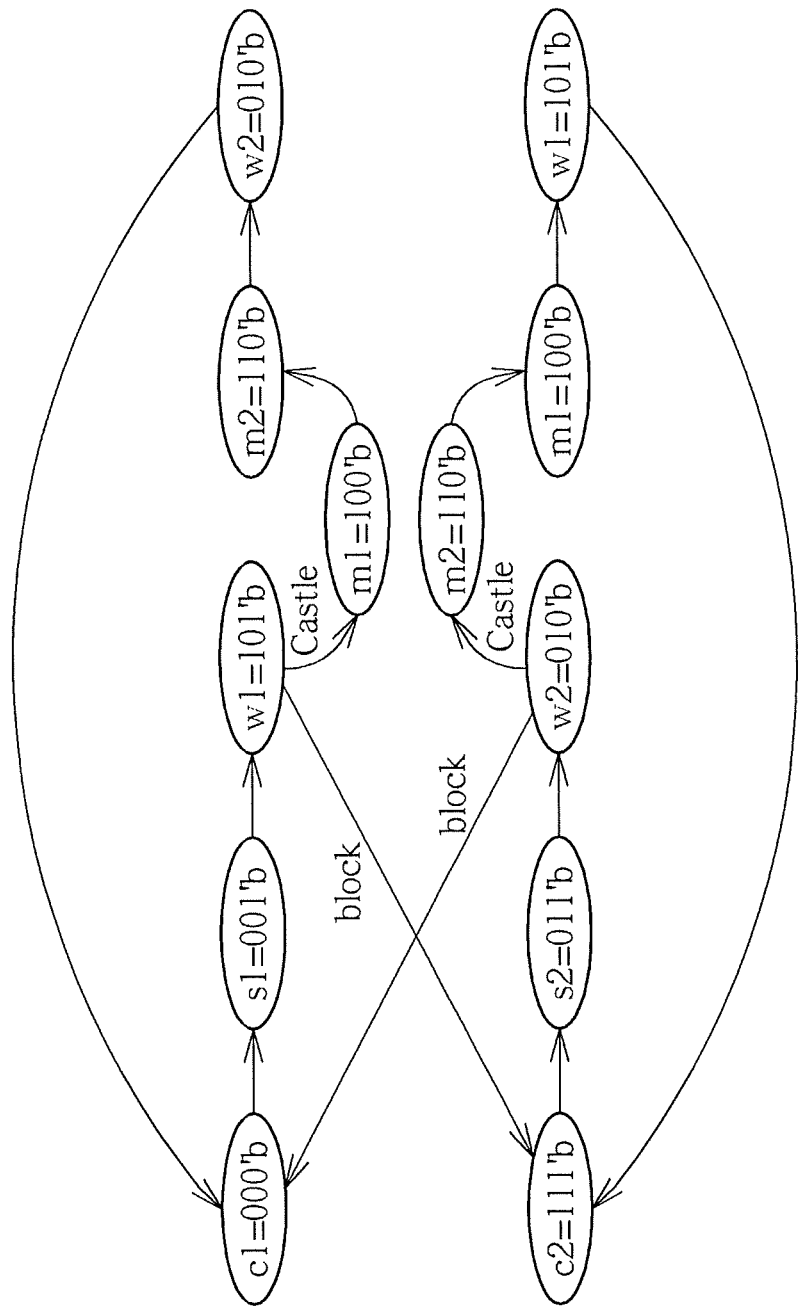
FIG. 14 shows a fifth exemplary state diagram of the state machine shown in FIG. 4.

In above exemplary embodiments, the controller 302 is configured to employ a write strategy supporting power shape types including a block type, an L-shape type and a castle type as defined in the Blu-ray disc specification. However, in an alternative implementation, the controller 302 can be configured to employ a write strategy supporting power shape types only including a block type and a castle type. Please refer to FIG. 13 and FIG. 14. FIG. 13 shows a fourth exemplary state diagram of the state machine 404 shown in FIG. 4, and FIG. 14 shows a fifth exemplary state diagram of the state machine 404 shown in FIG. 4. The control codes c1 and c2 are mapped to the power symbol (power level) Pc, the control codes s1 and s2 are mapped to the power symbol (power level) Ps, the control codes m1 and m2 are mapped to the power symbol (power level) Pm, and the control codes w1 and w2 are mapped to the power symbol (power level) Pw. Regarding the exemplary state diagram shown in FIG. 13, when the control code is changed from w1 to m2 (or from w2 to m1) due to a state transition, there are two bits changed in the control code at the same time, which may lead to a glitch problem as mentioned above. Similar to the exemplary state diagram shown in FIG. 8, the state diagram shown in FIG. 14 has one state placed in the path between a state with the control code w1 and a state with the control code m2, and another state placed in the path between a state with the control code w2 and a state with the control code m1. In this way, the glitch problem can be avoided. As the state machine stays at the intermediate state in a short period, the minimum transmission pulse length is slightly shorter than a length corresponding to two power symbol periods in this exemplary embodiment, but still corresponds to more than one power symbol period. Compared to the conventional design, such an exemplary embodiment still effectively mitigates the undesired effects caused by the flex cable connected between the controller 302 and the LDD 304.

FIG. 13 and FIG. 14 show that certain state transitions are controlled according to the power shapes (e.g., block type, L-shape type, and castle type as defined in the Blu-ray disc specification); however, any decision rule mentioned above can be implemented to control the state transition from a current state to a next state when the current state in the state diagram has multiple state transition options. These alternative designs all fall within the scope of the present invention.

Besides, the mapping between the control codes and the power symbols (power levels) as shown in FIG. 13 and FIG. 14 merely serves as one example. Provided that the result is substantially the same, other code table design can be employed. For example, the mapping between the control codes and the power symbols (power levels) can be set according to one code table selected from following exemplary code table set, where the code values in decimal format include 0-7. Please note that only five code tables are illustrated for simplicity; however, this by no means implies that the total number of all available code tables is limited to 5.

| Code Value | 0 | 1 | 2 | 3 | 4 | 5 | 6 | 7 |
|---|---|---|---|---|---|---|---|---|
| Code Table 1 | Pc | Pc | Ps | Pw | Ps | Pw | Pw | Pm |
| Code Table 2 | Pc | Pc | Ps | Pw | Pw | Ps | Pw | Pm |
| Code Table 3 | Pc | Pc | Ps | Pw | Pw | Ps | Pm | Pw |
| Code Table 4 | Pc | Pc | Ps | Pw | Pw | Ps | Pm | Pm |
| Code Table 5 | Pc | Pc | Pw | Ps | Ps | Pw | Pw | Pm |

Figure 15:
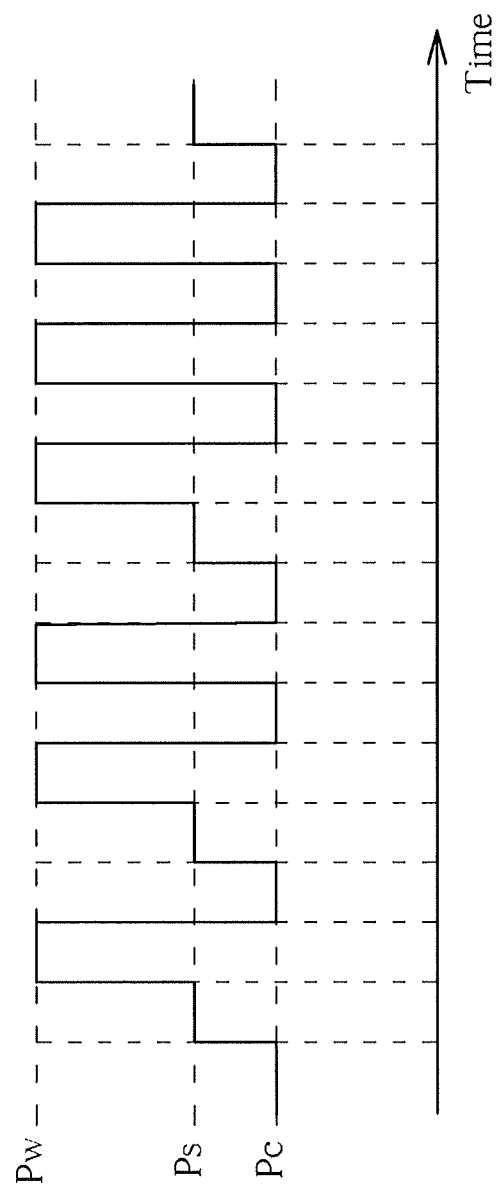
FIG. 15 is a waveform diagram illustrating an exemplary 2T multi-pulse write strategy.

In another alternative implementation, the controller 302 can be configured to employ a 2T multi-pulse write strategy which is commonly used for a BD-RE or DVD-RW disc under higher recording speed. For clarity, an exemplary 2T multi-pulse write strategy is shown in FIG. 15, where each power symbol has duration equal to 1T. As one can see from the figure, the duration of the write power Pw and the following cooling power Pc is equal to 2T rather than 1T, and the 2T multi-pulse write strategy is therefore applicable to high-speed data recording. Since the 2T multi-pulse write strategy is clearly defined in the optical disc specification and known to those skilled in the art, further description is omitted here for brevity. Based on the power sequence of the 2T multi-pulse write strategy for different T-patterns (e.g., 2T-9T for a Blu-ray disc), states of a state machine can be configured by referring to one of the following exemplary code tables, where the code values in decimal format include 0-7. Please note that only five code tables are illustrated for simplicity; however, this by no means implies that the total number of all available code tables is limited to 5.

| Code Value  | 0  | 1  | 2  | 3  | 4  | 5  | 6  | 7  |
|---|---|---|---|---|---|---|---|---|
| Code Table 1 | Pc | Pc | Pc | Pw | Pw | Pc | Ps | Ps |
| Code Table 2 | Pc | Pc | Pc | Pw | Pw | Ps | Pc | Ps |
| Code Table 3 | Pc | Pc | Ps | Pw | Pw | Pc | Ps | Pc |
| Code Table 4 | Pc | Pc | Ps | Pw | Pw | Ps | Pc | Pc |
| Code Table 5 | Pc | Pc | Ps | Pw | Pw | Ps | Pc | Ps |

Figure 16:
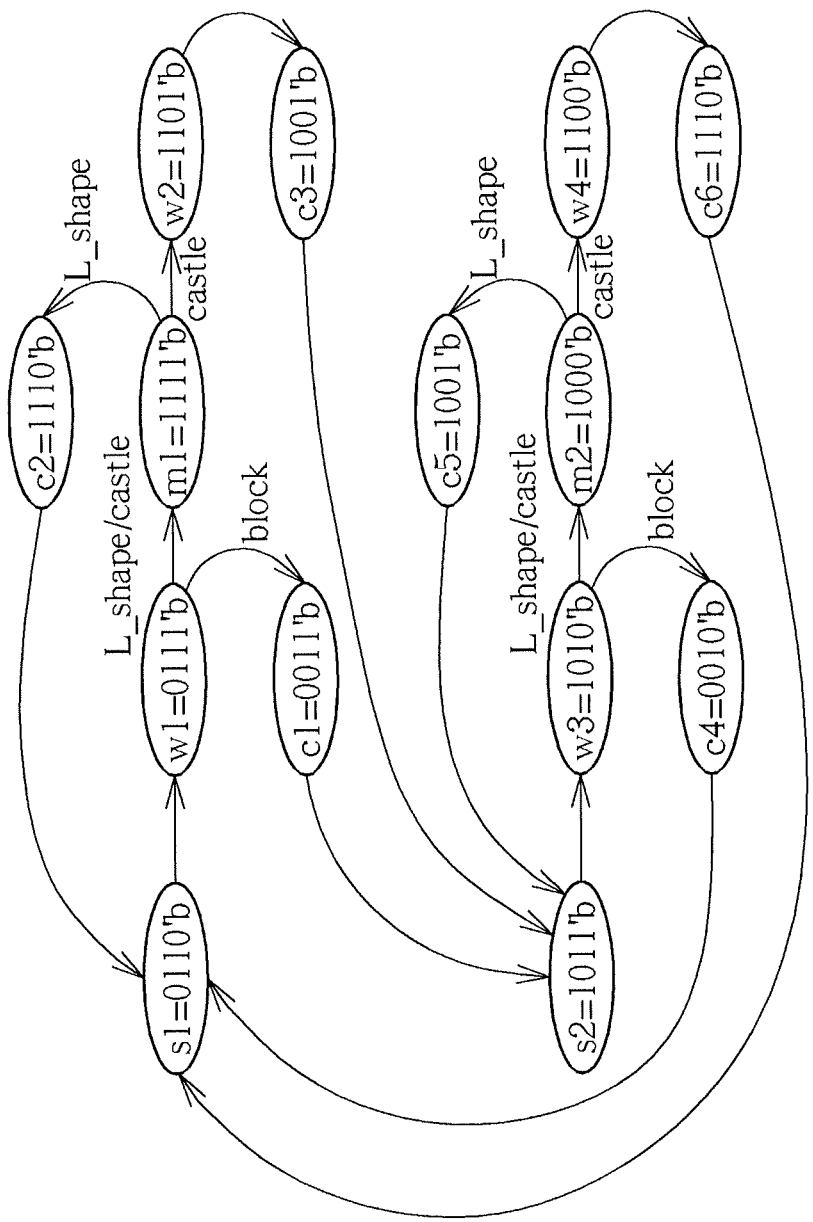
FIG. 16 shows an exemplary state diagram of a state machine used for generating control codes each having four bits respectively transmitted via four control signals according to the present invention.

In above exemplary embodiments, three control signals WEN1, WEN2, WEN3 are used to deliver control codes from the controller 302 to the LDD 304. However, using more than three control signals to deliver the control codes is also feasible. FIG. 16 shows an exemplary state diagram of a state machine used for generating control codes each having four bits respectively transmitted via four control signals. Taking a Blu-ray disc for example, the adopted write strategy supports power shape types including a block type, an L-shape type and a castle type. The control codes c1-c6 are mapped to the power symbol (power level) Pc, the control codes s1 and s2 are mapped to the power symbol (power level) Ps, the control codes m1 and m2 are mapped to the power symbol (power level) Pm, and the control codes w1-w4 are mapped to the power symbol (power level) Pw. As a person skilled in the pertinent art can readily understand operations of the state machine operated according to the state diagram shown in FIG. 16 after reading above paragraphs, further description is omitted here for brevity.

Briefly summarized, in accordance with the exemplary embodiments of the present invention, the controller and related method can effectively prevent the control signals from having the undesired short transmission pulse. More specifically, by configuring a code generator to employ adequate control codes mapped to power symbols (power levels) defined in the write strategy for data recording, a minimum transmission pulse length is guaranteed to correspond to more than one power symbol period. In this way, the high-speed recording of any optical storage medium, such as a Blu-ray disc or a digital versatile disc, can benefit from the exemplary control signal transmission scheme of the present invention to thereby achieve better write quality.

Those skilled in the art will readily observe that numerous modifications and alterations of the device and method may be made while retaining the teachings of the invention.

The invention claimed is:

1. A controller of an optical storage apparatus for generating a plurality of control signals, comprising:
a code generator, configured for determining a plurality of control codes according to an input data associated with data recording, and generating the control signals to deliver the control codes, wherein regarding each of the control signals, a minimum transmission pulse length thereof corresponds to more than one power symbol period.

2. The controller of claim 1, wherein the controller is configured for generating the control signals to a laser diode driver of the optical storage apparatus.

3. The controller of claim 1, wherein the power levels represented by the control codes determined by the code generator comply with a write strategy supporting power shape types including a block type, an L-shape type and a castle type, comply with a write strategy supporting power shape types only including a block type and a castle type, or comply with a 2T multi-pulse write strategy.

4. The controller of claim 1, wherein a number of the control signals is not smaller than three, and the minimum transmission pulse length corresponds to at least two power symbol periods.

5. The controller of claim 1, wherein the input data are data to be recorded, and the control codes determined by the code generator include a specific control code which is generated by checking the input data to determine a T-pattern corresponding to the specific control code, and setting the specific control code according to the determined T-pattern.

6. The controller of claim 1, further comprising:
a write strategy circuit, coupled to the code generator, for processing data to be recorded to derive power shape data which serve as the input data;
wherein the control codes determined by the code generator include a specific control code which is generated by referring to the input data for determining a power shape type corresponding to the specific control code, and setting the specific control code according to the determined power shape type.

7. The controller of claim 1, further comprising:
a write strategy circuit, coupled to the code generator, for processing data to be recorded to derive input codes which are indicative of power levels and serve as the input data;
wherein the control codes determined by the code generator includes a specific control code which is generated by referring to the input data to determine at least one second input code following a first input code corresponding to the specific control code, and setting the specific control code according to the determined at least one second input code.

8. The controller of claim 1, wherein the control codes determined by the code generator include at least one control code mapped to different power levels.

9. The controller of claim 1, wherein the code generator comprises:
a state machine, operated according to the input data and having a plurality of states respectively corresponding to a plurality of predetermined control codes, wherein the state machine outputs a specific control code of a specific state when entering the specific state according to the input data.

10. The controller of claim 9, wherein the code generator further comprises:
a code table, coupled to the state machine, for storing the predetermined control codes mapped to the states, respectively, wherein the state machine requests the code table for the specific control code mapped to the specific state when entering the specific state.

11. A method employed in an optical storage apparatus for generating a plurality of control signals, comprising:

determining a plurality of control codes according to an input data associated with data recording, wherein each of the control codes represents at least one power level; and generating the control signals to deliver the control codes, wherein regarding each of the control signals, a minimum transmission pulse length thereof corresponds to more than one power symbol period.

12. The method of claim 11, further comprising:
transmitting the control signals to a laser diode driver of the optical storage apparatus.

13. The method of claim 11, wherein the power levels represented by the control codes comply with a write strategy supporting power shape types including a block type, an L-shape type and a castle type, comply with a write strategy supporting power shape types only including a block type and a castle type, or comply with a 2T multi-pulse write strategy.

14. The method of claim 11, wherein a number of the control signals is not smaller than three, and the minimum transmission pulse length corresponds to at least two power symbol periods.

15. The method of claim 11, wherein the input data are data to be recorded, and determining the control codes according to information transmitted via the input data comprises:
checking the input data to determine a T-pattern corresponding to a specific control code; and
setting the specific control code according to the determined T-pattern.

16. The method of claim 11, further comprising:
processing data to be recorded to derive power shape data which serve as the input data;
wherein determining the control codes according to information transmitted via the input data comprises:
determining a power shape type corresponding to a specific control code according to the input data; and
setting the specific control code according to the determined power shape type.

17. The method of claim 11, further comprising:
processing data to be recorded to derive input codes which are indicative of power levels and serve as the input data;
wherein determining the control codes according to information transmitted via the input data comprises:
referring to the input data to determine at least one second input code following a first input code corresponding to a specific control code; and
setting the specific control code according to the determined at least one second input code.

18. The method of claim 11, wherein the control codes include at least one control code mapped to different levels.

19. The method of claim 11, wherein determining the control codes according to the input data associated with data recording comprises:
utilizing a state machine operated according to the input data, wherein the state machine has a plurality of states respectively corresponding to a plurality of predetermined control codes; and
outputting a specific control code of a specific state when the state machine enters the specific state according to the input data.

20. The method of claim 19, wherein determining the control codes according to the input data associated with data recording further comprises:
storing the predetermined control codes mapped to the states in a code table, respectively; and
requesting the code table for the specific control code mapped to the specific state when the state machine enters the specific state.

* * * * *